(12) United States Patent
Xu et al.

(10) Patent No.: US 10,884,825 B2
(45) Date of Patent: Jan. 5, 2021

(54) APPLICATION PROGRAMMING INTERFACE (API) SERVICE APPARATUS AND APPLICATION PROGRAMMING INTERFACE (API) SERVICE SYSTEM

(71) Applicant: BOE Technology Group Co., Ltd., Beijing (CN)

(72) Inventors: Hao Xu, Beijing (CN); Hong Wang, Beijing (CN); Suo Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/181,927

(22) Filed: Nov. 6, 2018

(65) Prior Publication Data

US 2019/0227856 A1    Jul. 25, 2019

(30) Foreign Application Priority Data

Jan. 19, 2018   (CN) .......................... 2018 1 0053605

(51) Int. Cl.
  *G06F 9/54*        (2006.01)
  *G06F 21/44*       (2013.01)
  *G06F 9/50*        (2006.01)

(52) U.S. Cl.
  CPC ............ *G06F 9/542* (2013.01); *G06F 9/5011* (2013.01); *G06F 9/541* (2013.01); *G06F 21/44* (2013.01)

(58) Field of Classification Search
  CPC ..................................................... G06F 9/541
  USPC ....................................................... 719/328
  See application file for complete search history.

(56) References Cited

U.S. PATENT DOCUMENTS

| | | | | |
|---|---|---|---|---|
| 10,075,442 | B2 * | 9/2018 | Simpson | ................. H04L 67/10 |
| 10,120,734 | B1 * | 11/2018 | Doraiswamy | ........... G06F 21/44 |
| 10,445,151 | B1 * | 10/2019 | Ko | ....................... H04L 67/2833 |
| 2009/0328174 | A1 | 12/2009 | Cen et al. | |
| 2013/0054810 | A1 * | 2/2013 | Lee | ....................... H04L 47/808 |
| | | | | 709/226 |
| 2013/0104150 | A1 * | 4/2013 | Rdzak | ....................... G06F 9/54 |
| | | | | 719/328 |

FOREIGN PATENT DOCUMENTS

| | | |
|---|---|---|
| CN | 101616136 A | 12/2009 |
| CN | 103701761 A | 4/2014 |
| CN | 105187372 A | 12/2015 |
| CN | 106295330 A | 1/2017 |

(Continued)

OTHER PUBLICATIONS

First Office action dated Jul. 3, 2020 for application No. CN201810053605.5 with English translation attached.

*Primary Examiner* — Andy Ho
(74) *Attorney, Agent, or Firm* — Nath, Goldberg & Meyer; Joshua B. Goldberg; Stephanie F. Majkut

(57) ABSTRACT

An application programming interface (API) service apparatus comprising a gateway device and a back-stage management device is provided, and the gateway device is configured to validate a request for invoking the API resources and to invoke the respective API resources in respective servers according to the request for invoking the API resources which has passed the validation; the back-stage management device is configured to receive publication information for the API resources, and to check the received publication information for the API resources.

19 Claims, 2 Drawing Sheets

(56) References Cited

FOREIGN PATENT DOCUMENTS

| CN | 106372532 A | 2/2017 |
|---|---|---|
| CN | 106559389 A | 4/2017 |
| CN | 106920204 A | 7/2017 |

\* cited by examiner

APPLICATION PROGRAMMING INTERFACE (API) SERVICE APPARATUS AND APPLICATION PROGRAMMING INTERFACE (API) SERVICE SYSTEM

CROSS REFERENCE TO RELATED APPLICATIONS

The present application claims the priority of the Chinese Patent Application with the Application No. 201810053605.5 filed on Jan. 19, 2018, which is incorporated herein in the entire by reference.

TECHNICAL FIELD

The present disclosure relates to a field of computer, in particular to an application programming interface (API) service apparatus and an application programming interface (API) service system including the application programming interface (API) service apparatus.

BACKGROUND

With a rapid development of an internet industry and an intelligent apparatus, various applications have become popular that can be installed on the intelligent apparatus. In order to obtain perfect functions of these applications, it may be required to invoke some of API resources. Digital assets within an enterprise need to be opened for internal and external developers in a form of the API, while it is expected that internal systems also can invoke some external functions of the API.

SUMMARY

The present disclosure provides an application programming interface (API) service apparatus including a gateway device and a back-stage management device, the gateway device is configured to receive and store information regarding API resources, and is configured to validate a request for invoking the API resources and to determine the API resources corresponding to the request for invoking the API resources which has passed the validation based on the stored information regarding the API resources and to invoke the API resources in respective servers corresponding to the request for invoking the API resources which has passed the validation; and the back-stage management device is configured to receive publication information for the API resources, and to check the received publication information for the API resources.

In some embodiments, the gateway device is further configured to monitor an invocation condition of the API resources corresponding to information of the API resources, to obtain invocation information.

In some embodiments, the invocation information includes at least one of an invocation amount of the API resources, an invocation form of invoking the API resources, a response time to the request for invoking the API resources and an error rate of the API service apparatus.

In some embodiments, the back-stage management device is further configured to add information for the API resources comprised in the publication information for the API resources which has passed the checkout to the gateway device.

In some embodiments, the back-stage management device includes a user management processor and a back-stage management processor, the back-stage management processor is configured to check the received publication information for the API resources, and to add the information for the API resources which has passed the checkout to the gateway device, and to select an authority of an operation of the account type associated with the API service apparatus, and the user management processor is configured to allocate an authority corresponding to the account type of the account associated with the API service apparatus according to the authority defined by the back-stage management processor.

In some embodiments, the back-stage management device is further configured to perform at least one of the following operations of: creating an account, deleting an account, managing account information for a requester of the API resources, managing account information for a publisher of the API resources, inquiring a log for invoking the API resources, performing the examination and approval of a real name authentication of the subscriber of the API resources and inquiring a log for operations of an administrator.

In some embodiments, the user management processor is configured to allocate the authority of publishing the API resources for the account of the publisher of the API resources; the user management processor is further configured to allocate for the account of the back-stage administrator at least one of the authorities: the authority of checking a real name authentication of the subscriber of the API resources, the authority of checking the publication information, the authority of managing a category of the API resources which have passed the checkout.

In some embodiments, the gateway device is configured to perform an identity authentication and an authority authentication for the account corresponding to the request for invoking the API resources in response to a reception of the request for invoking the API resources, and the gateway device is further configured to invoke the corresponding API resources with the identity authentication and the authority authentication of the account corresponding to the request for invoking the API resources being in the state where the authentication has been passed.

In some embodiments, the gateway device is configured to support a Hash-based Message Authentication Code algorithm signature and a Secure Sockets Layer encryption.

In some embodiments, the gateway device is further configured to identify key words of the request for invoking the API resources received by the gateway device, and invoke the corresponding API resources according to the key words.

In some embodiments, the gateway device is configured to perform a protocol conversion, to convert a computer language of the corresponding request for invoking the API resources into a computer language of the request for invoking the API resources which has passed the verification from the gateway device in the case where the computer language of the request for invoking the API resources which has passed the verification from the gateway device is inconsistent with the computer language of the corresponding API resources.

In some embodiments, the gateway device is further configured to perform at least one of the following functions of: a limit for a blacklist and a whitelist of Internet Protocol locations, a limit for invocation flows, a network protocol encryption transmission, a Access Key/Secret Access Key and a certificate validation, a service authority.

In some embodiments, the API service apparatus further includes servers configured to store the API resources.

The present disclosure further provides an application programming interface (API) service system, including at least one front end device and the above API service apparatus, the front end device includes a front end processor and a display device, the display device configured to display an API service interface for receiving the inputted request for invoking the API resources and for providing a portal uploading the publication information for the API resources, under a control of the front end processor, the front end processor configured to send the request for invoking the API resources to the gateway device of the API service apparatus, and the front end processor is further configured to receive the publication information for the API resources and send the publication information for the API resources to the back-stage management device of the API service apparatus.

In some embodiments, the front end processor is further configured to control the display device to show a search portal through which the API service interface shows the API resources, and the front end processor is further configured to search in the information for the API resources stored in the gateway device according to a received search instruction, and generate the search result.

In some embodiments, the front end processor is further configured to control the display device to show in the API service interface at least one of following functions of: showing information for the API resources stored in the gateway device in a predetermined rule, showing a publication rule for the API resources, showing a registration interface for users, showing a login interface for users, showing a checking result of the publication information for the API resources by the back-stage management device, showing a verification result of the invocation request by the gateway device.

BRIEF DESCRIPTION OF DRAWINGS

Figures are provided for further understanding the present disclosure and as a part of the description, and are used for explaining the present disclosure together with the following detailed description of embodiments, but the figures are not to limit the present disclosure, in which.

DETAIL DESCRIPTION OF EMBODIMENTS

The following detailed description of embodiments of the present disclosure will be described in detail below in conjunction with the accompanying drawings. It should be understood that the detailed description of embodiments described herein is only used for illustrating and explaining the present disclosure, not limiting the present disclosure.

With a rapid development of an internet industry and an intelligent apparatus, various of applications has become popular that can be installed on the intelligent apparatus. In order to perfect functions of these applications, it may need to invoke some of API (application programming interface) resources. Digital assets within an enterprise need to be opened for internal and external developers in a form of the API, while it is expected that internal systems also can invoke some external functions of the API. These functions of the API need a unified portal for publication and subscription, while there is a need for corresponding API gateways to cause a safety protection of digital assets (functions of the API). However, an existing open gateway framework only manages a device access module, and cannot meet a control for a digital integration of an application layer.

At least one embodiment provided by the present disclosure provides an application programming interface (API) service apparatus and an application programming interface (API) service system. The application programming interface (API) service apparatus provided by the present disclosure can provide a unified portal with a security assurance for providers of the API resources.

For example, an enterprise developing application programming interface resources can publish information regarding application programming interface resources developed by the enterprise on a gateway device of the application programming interface service apparatus via a front end device, such that application programming interface resources developed by the enterprise can be used reasonably. And, the gateway device may also protect the application programming interface resources. The enterprise developing application programming may obtain the desired application programming interface resources at the application programming interface service apparatus via the front end device.

Figure 1:
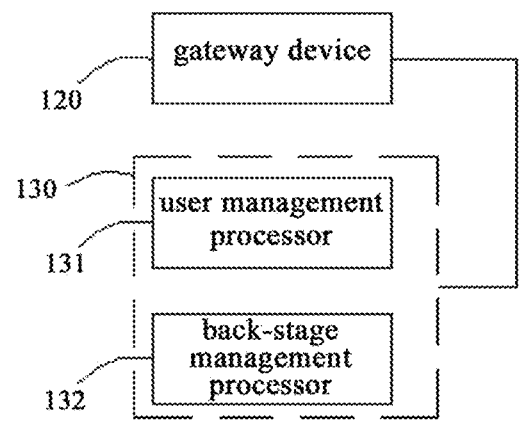
FIG. 1 is a structural diagram of an application programming interface (API) service apparatus according to some embodiments of the present disclosure.

FIG. 1 is a structural diagram of an application programming interface (API) service apparatus according to at least one embodiment of the present disclosure. As one aspect of the present disclosure, it provides an application programming interface (API) service apparatus, and as shown in FIG. 1, the application programming interface service apparatus includes a gateway device 120 and a back-stage management device 130.

The API resources may be stored on other servers and be invoked by applications to implement a specific assistant function by the use of the API. Taking the applications "WeChat", "WhatsApp" as examples, the API may implement a specific function in an assist. For example, when registering an account, a server may be connected storing the API resources required for such a function of "sending a validate code", and the API resources with the "sending a validate code" are invoked to send a validate code to a phone number or e-mail of the account registrant.

Information regarding the API resources is stored in the gateway device 120, which is configured to validate a request for invoking the API resources received from a requester for the API resources and is also configured to determine the API resources corresponding to the request for invoking the API resources which has passed the validation based on information regarding the API resources stored in the gateway device 120, and to invoke the API resources corresponding to the request for invoking the API resources which has passed the validation in respective servers.

The back-stage management device 130 is configured to receive publication information for the API resources published by a publisher of the API resources, and to check the received publication information for the API resources. Only when the publication information has passed the checkout, the API resources corresponding to the publication information can be published in an API store. In contrast, the API resources corresponding to the publication information which has not passed the checkout cannot be published in an API store.

In some embodiments, the gateway device 120 may store information for the API resources in a list.

In the present disclosure, the gateway device 120 validates the request for invoking the API resources. The API resources may be invoked only based on the request for invoking the API resources which has passed the validation, while the API resources cannot be invoked in case where the request for invoking the API resources which has not passed the validation, such that security may be improved for servers for the API resources.

For example, the publication information for the API resources may include information, such as functions and contents for the API resources, etc. and the back-stage management device 130 may check information, such as functions and contents for the API resources, etc., when checking the received publication information for the API resources. The received publication information for the API resources with violation information cannot pass the checkout.

In some embodiments, the back-stage management device 130 is also configured to return a result of "not pass the checkout" to the publisher of the API resources when the publication information for the API resources does not pass the checkout, and to return a result of "pass the checkout" to the publisher of the API resources when passing the checkout.

The API service apparatus of the present disclosure may provide a unified portal with a security assurance for an enterprise.

Figure 2:
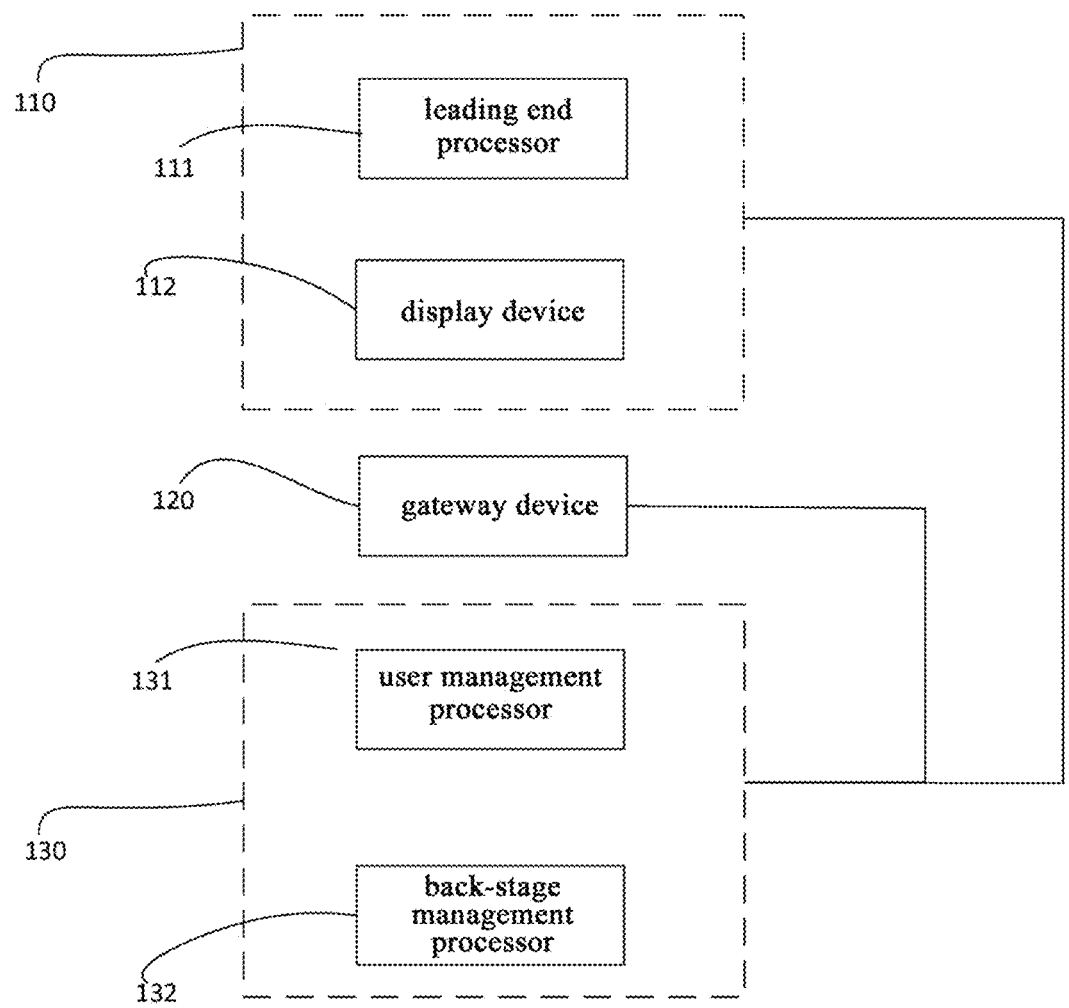
FIG. 2 is a structural diagram of an application programming interface (API) service system according to some embodiments of the present disclosure.

For example, as shown in FIG. 2, an enterprise developing the API resources can publish the API resources developed by the enterprise via a front end device 110, such that the API resources developed by the enterprise can be used reasonably. And, the gateway device 120 may also protect the API resources. The enterprise developing applications may obtain the desired API resources at the API service apparatus via the front end device 110.

In some embodiments, in order to facilitate the management of the API resources and provide a better service for users (including a publisher of the API resources, a requester of the API resources, an operator of the API service apparatus) of the API service apparatus, for example, to cause an operator of the API service apparatus and a publisher of the API resources to clearly understand an operating condition of the API and a behavior habit of a requester of the API resources, the gateway device 120 is also configured to monitor (such as, real-time visual monitoring) an invocation condition of the API resources corresponding to information of the API resources, to obtain the invocation information.

For example, the invocation information includes at least one of an invocation amount of the API resources, an invocation form of invoking the API resources, a response time to the request for invoking the API resources and an error rate of the API service apparatus.

The operator of the API service apparatus and the publisher of the API resources may clearly understand the operating condition of the API and the behavior habit of a requester of the API resources after having obtained the invocation information, such that they may provide the API resources catering to a market better, to obtain a more profit.

For example, the operator of the API service apparatus may invoke the invocation information generated by the gateway device 120 through devices such as a computer, a server etc. Similarly, the publisher of the API resources may also invoke the invocation information generated by the gateway device 120 remotely through devices located in one end of the publisher of the API resources such as a computer, a server etc. Perhaps, the gateway device 120 may send the invocation information to a display device at a side of the operator actively, or to a display device at a side of the publisher of the API resources actively.

Optionally, the back-stage management device 130 is also configured to add information for the API resources to the gateway device 120 with the publication information for the API resources being in the state where the checkout has been passed, to help the gateway device to invoke the desired API resources.

In the present disclosure, the back-stage management device 130 provides a unified management for the API service apparatus. The back-stage management device 130 may not only manage the users of the API resources (including a publisher of the API resources, a requester of the API resources, an operator of the API service apparatus), but also manage the API resources published by the publisher of the API resources.

In some embodiments, the back-stage management device 130 may include a user management processor 131 and a back-stage management processor 132.

The back-stage management processor 132 is configured to check the received publication information for the API resources, and to add the information for the API resources which has passed the checkout to the gateway device 120, and to select an authority of an operation of the account type associated with the API service apparatus.

For example, the account type associated with the API service apparatus includes all accounts which can be registered to the API service apparatus, and accounts which are not registered to the API service apparatus (such as accounts which are "visitors"). That is, one of functions of the back-stage management processor 132 is to define an authority of all account types (such as including a publisher, a requester, an administrator, a visitor etc.).

The user management processor 131 is configured to allocate the authority for the account registered to the API service apparatus according to the authority defined by the back-stage management processor 132. In other words, the user management processor 131 is configured to add and manage the final users of cloud products (such as the API resources) in a form of tenants.

The user management processor 131 is configured to allocate the authority corresponding to the account type of the account for the account associated with the API service apparatus according to the authority defined by the back-stage management processor 132.

For example, the user management processor 131 allocates an authority, such as a request for invoking the API resources and searching the API resources, for a requester of the API resources, and do not allocates an authority of publishing the API resources therefor. Accordingly, the user management processor 131 allocates the authority of publishing the API resources for an account of a publisher of the API resources.

For example, the user management processor 131 allocates the authority of approving the subscription of the API resources for an account of a publisher of the API resources. After a subscriber of the API resources passed a real name authentication, the subscription of the API resources may be performed. After the subscription is completed, the subscriber of the API resources may issue the request for invoking the API resources.

For example, the user management processor 131 may be also configured to allocate for a back-stage administrator at least one of the following authorities: checking the real name authentication for the subscriber of the API resources, and meanwhile checking the publication information for the API resources sent by the publisher of the API resources, and managing a category of the API resources.

In some embodiments, in order to improve the stability of the API service and monitor the API service better, the back-stage management device 130 is also configured to perform at least one of the following operations: creating an account (such as creating an account of an administrator, creating an account of a secondary administrator, creating an account of a requester of the API resources, creating an account of a publisher of the API resources, etc.), deleting an account (such as deleting an account of an administrator, deleting an account of a secondary administrator, deleting an account of a requester of the API resources, deleting an account of a publisher of the API resources, etc.), managing information for a requester of the API resources, managing account information for a publisher of the API resources, inquiring a log for invoking the API resources, performing the examination and approval of a real name authentication of the subscriber of the API resources and inquiring a log for operations of an administrator.

In some embodiments, in order to maintain an operation safety better, the user management processor 131 allocates the corresponding authority for the account associated with the API service apparatus, the authority including: allocating the authority of publishing the publication information for the API resources for the account of the publisher of the API service apparatus; allocating for an account of the back-stage administrator at least one of the authority of checking a real name authentication of the subscriber of the API resources, the authority of checking the publication information, the authority of managing a category of the API resources which have passed the checkout.

In embodiments of the present disclosure, the gateway device 120 may improve a security of API servers and a security of the API service apparatus, specifically, the gateway device 120 is configured to perform an identity authentication and an authority authentication for the account corresponding to the request for invoking the API resources upon a reception of the request for invoking the API resources, and the gateway device 120 is also configured to invoke the corresponding API resources with the identity authentication and the authority authentication of the account corresponding to the request for invoking the API resources being in the state where the authentication has been passed.

In some embodiments, the gateway device 120 supports a Hash-based Message Authentication Code (HMAC) algorithm signature and a Secure Sockets Layer (SSL) encryption.

In order to meet requirements for different requesters of the API resources, optionally, the gateway device 120 is also configured to identify key words from the request for invoking the API resources received by the gateway device, and invoke the corresponding API resources according to the key words.

In some embodiments, the request for invoking the API resources includes a plurality of keywords, and the gateway device is configured to invoke corresponding API resource according to each of the keywords.

For example, when the requester of the API resources invokes such two functions of "attribution" and "weather state of the attribution" according to the request for invoking the API resources, the gateway device 120 may extract such two key words of "attribution" and "weather state of the attribution" from the request for invoking the API resources, and then invoke the corresponding API resources, respectively.

In order to improve a range of application of the API service apparatus, to meet different requirements for different users and to avoid a repeat development of functions, optionally, the gateway device 120 is also configured to perform a protocol conversion, to convert a computer language of the corresponding request for invoking the API resources into a computer language of the request for invoking the API resources which has passed the verification from the gateway device in the case where the computer language of the request for invoking the API resources which has passed the verification from the gateway device is inconsistent with the computer language of the corresponding API resources.

For example, when the API resources provided by the publisher of the API resources is written in the Java language but an operating environment of the publisher of the API resources is the Python language, the protocol conversion may be performed by the gateway device 120 to convert the Java language from the API resources into the Python language.

In order to improve a security of the operating environment, optionally, the gateway device 120 is also configured to perform at least one of the following functions: a limit for a blacklist and a whitelist of Internet Protocol (IP) locations, a limit for invocation flows, a Hyper Text Transfer Protocol (Https) encryption transmission, a Access Key/Secret Access Key (AK/SK) and a certificate validation, a service authority, etc.

As described above, after the request for invocation has passed the validation from the gateway device, the API resources are invoked in the corresponding servers. Optionally, the API service apparatus also includes servers configured to store the API resources.

Figure 3:
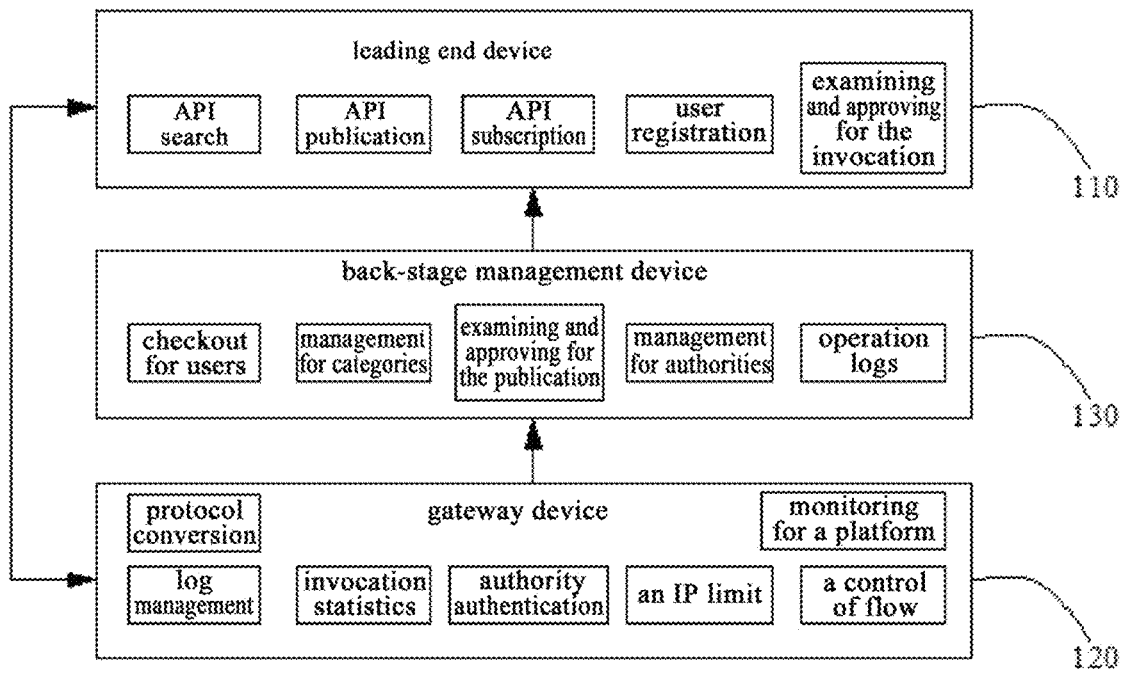
FIG. 3 is a structural diagram of an application programming interface (API) service system according to some embodiments of the present disclosure.

FIG. 2 is a structural diagram of an application programming interface (API) service system according to some embodiments of the present disclosure. FIG. 3 is a structural diagram of an application programming interface (API) service system according to some embodiments of the present disclosure. At least one embodiment of the present disclosure provides an API service system, including at least one front end device 110 and the API service apparatus according to above embodiments of the present disclosure.

The front end device 110 includes a front end processor 111 and a display device 112, and the display device 112 is configured to display an API service interface under a control of the front end processor 111, the API service interface configured to obtain the inputted request for invoking the API resources and also configured to provide a portal uploading the publication information for the API resources.

The front end processor 111 is configured to send the received request for invoking the API resources to the gateway device 120 of the API service apparatus, and the front end processor 111 is also configured to receive the publication information for the API resources and send the publication information for the API resources to the back-stage management device 130 of the API service apparatus.

In at least one embodiment of the present disclosure, the front end device 110 is configured to display applications or a graphic user interface (GUI) of webs, and to display the API resources via the display device 112.

Figure 4:
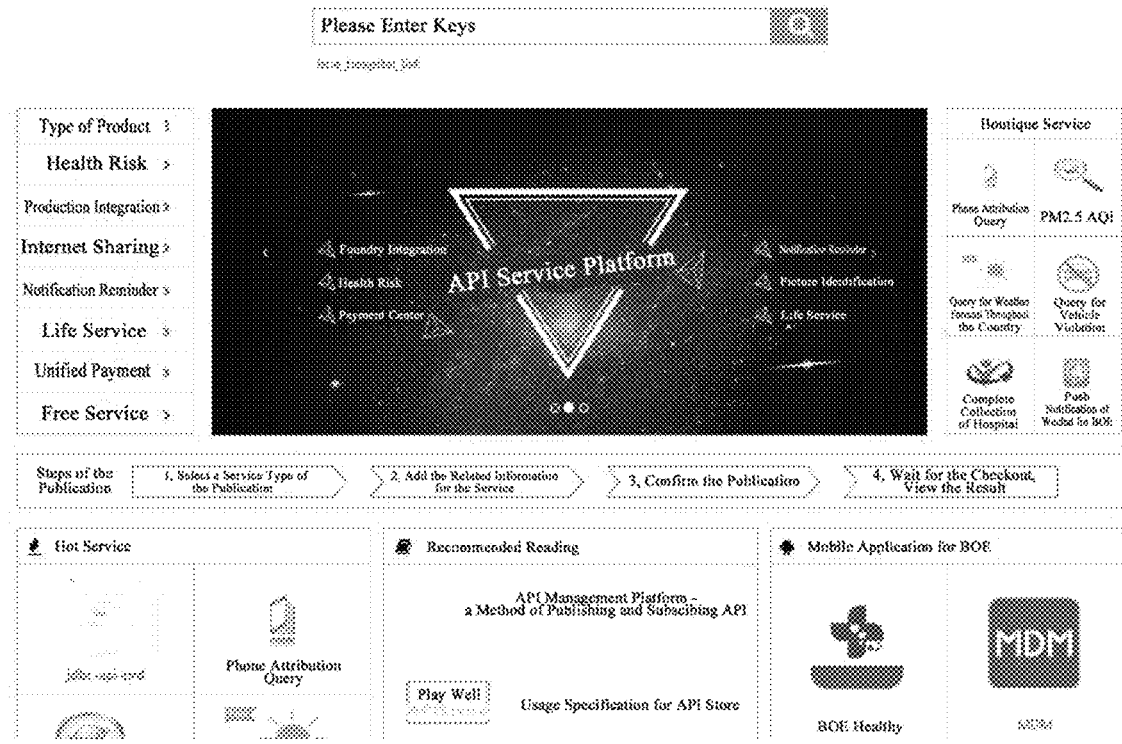
FIG. 4 is a diagram of a display device of a front end device for an application programming interface (API) service system according to some embodiments of the present disclosure.

For example, the API resources may be shown in a form of a list or in a form of icons (or thumbnails) of the API resources. For example, as shown in FIG. 4, the display device 112 of the front end device 110 displays thumbnails of icons of the API resources, as described in detail below.

In embodiments of the present disclosure, all or only parts of the API resources may be displayed.

Optionally, the front end processor 111 may also be configured to control a search portal through which the API service interface shows the API resources. Accordingly, the front end processor 111 is also configured to search in information for the API resources stored in the gateway device 120 according to a received search instruction, and generates the search result.

The API service system can manage the API resources provided by the publisher of applications intensively, and provide a platform of the API resources for the requester of the API resources, such that services may be achieved better.

FIG. 4 is a diagram of contents displayed in a display device of a front end device of an application programming interface (API) service system according to some embodiments of the present disclosure.

As shown in FIG. 4, in an interface displayed in the display device, the API service interface may include a search input field. The requester of the API resources may search information for the API resources stored in the gateway device 120 by inputting a name of the API resources in the search input field, thereby generating the search result.

For example, the search result may include: no API resources matched with the search instruction, names and acquisition forms for the API resources corresponding to the search instruction, etc. Accordingly, the display device 112 of the front end device 110 may be configured to display the search result.

Certainly, the requester of the API resources may also obtain the API resources by clicking icons of the API resources in the input interface of the request.

Optionally, the API service interface may also display steps of the publication for the API resources. For example, as shown in FIG. 4, the steps of the publication include: 1, selecting a service type of the publication; 2, adding the related information for the service; 3, confirming the publication; 4, waiting for the checkout, and viewing the result.

Optionally, the API service interface may also display other contents. For example, the API service interface may also display contents such as hot services, boutique services, product logo (the platform for the API service).

Optionally, the front end processor 111 is also configured to control the API service interface to perform at least one of following functions: showing information for the API resources stored in the gateway device 120 in a predetermined rule, showing a publication rule for the API resources, showing a registration interface for users, showing a login interface for users, showing a checking result of the publication information for the API resources by the back-stage management device 130, showing a verification result of the invocation request by the gateway device 120.

For example, the API service interface may provide a unified interface of inquiring, publishing, subscribing the API resources, and the API resources may be shown in the API service interface in a form of data products.

The API service apparatus of the present disclosure may provide a unified portal with a security assurance. For example, an enterprise developing the API resources can publish the API resources developed by the enterprise via a front end device 110, such that the API resources developed by the enterprise can be used reasonably. And, the gateway device 120 may also protect the API resources. The developer of applications may obtain the desired API resources at the API service apparatus via the front end device 110.

In some embodiments, as shown in FIG. 3, functions such as search for the API, publication for the API, subscription for the API, user registration, examining and approving for the invocation may be provided in the API service interface displayed by the front end device 110.

For example, the function of examining and approving for the invocation includes displaying a result for examining and approving for the invocation.

In some embodiments, the back-stage management device 130 has functions such as checkout for users, management for categories, examining and approving for the publication, management for authorities, operation logs.

For example, the function of operation logs includes invoking operation logs and inquiring operation logs etc.

In some embodiments, the gateway device 120 may have functions such as protocol conversion, log management, invocation statistics, authority authentication, an IP limit, a control of flow, and monitoring for a platform.

For example, the function of monitoring for a platform includes monitoring an error rate of the back-stage management device 130.

In the API service system according to embodiments of the present disclosure, the API resources provided by the developer are shown on the API service interface of the front end device 110 in a form of products, so as to be obtained by the requester who wants the API.

The API service system implements functions such as the publication for the API resources, the subscription for the API resources, a track for an invocation measure of the API resources, the user management and the back-stage management by the front end device 110 and the API service apparatus, thereby obtaining an effect management and control and regulation for the API resources, such that it may solve problems of the open of digital assets within an enterprise introducing a non-unified portal and no security assurance.

In embodiments of the present disclosure, regarding description for the devices and processors etc., they are functional entities, and do not have to correspond to physically and logically independent entities. For example, the gateway device and the back-stage management device may be implemented by at least one of the following manners: different computers implement and perform corresponding functions, respectively; and they are integrated in a same computer and the computer performs computer instructions corresponding to functions (these computer instructions are expressed logically in corresponding software). Similarly, the user management processor, the back-stage management processor and the front end processor may be different processors located in different computers or a same computer, and also may be a same processor located in a same computer. At the same time or at different times, processors execute computer instructions corresponding to functions to implement the corresponding functions.

In some embodiments of the present disclosure, the device, the computer or the like may be implemented as a desktop, a laptop, a server or the like, it may be a portable device such as a tablet or a smartphone, or it may be implemented as cloud-based computing.

In embodiments of the present disclosure, the processors may be one or more logic operation devices, such as central processing units (CPUs), Field Programmable Gate Arrays (FPGAs), Microprogrammed Control Units (MCUs), digital signal processors (DSPs), Application-Specific Integrated Circuits (ASICs) and any other devices that have data processing capacities and/or program execution capacities In embodiments of the present disclosure, the display device is used to display software and an operation interface. For example, it may be a separate display including display panels such as LCD and OLED or may be a display screen integrated on a computer.

In order to implement the corresponding functions, it is easily understood that a memory may store computer instructions corresponding to functions. The memory may be, for example, a volatile memory and/or a nonvolatile memory. The volatile memory may include, for example, a RAM and/or a cache memory etc. The nonvolatile memory may include, for example, a ROM, a hard disk and a Flash etc.

Connection and data transmission of the devices may be implemented through a network connection, such as a wireless network, a wire network and/or any combination of a wireless network and a wire network. A network may include a local area network, an Internet, a telecommunication network, an Internet of Things based on an Internet and/or a telecommunication network and/or any combination of above. For example, the wire network may perform communication using transmission forms such as twisted-pairs, coaxial-cables or optical fibers. For example, the wireless network may use transmission forms such as a 3G/4G/5G mobile communication network, a Bluetooth, a Zigbee or a Wi-Fi.

The figures illustrate architectures, functions and operations that may be implemented according to the devices and systems in various embodiments of the present disclosure. In this regard, each block in the schematic diagrams or block diagrams may represent one module, one program segment or one part of codes, which contain at least one executable instruction for implementing a specific logical function. It should be noted that in some implementation as an alternative, functions labeled in blocks may also be occurred in the labeled order different from that in figures. For example, actually, two blocks shown in succession may substantially be concurrently performed, sometimes, may be performed in an inverse order, depending on the related functions. It is also noted that each block in the block diagrams and/or flow diagrams and any combination of blocks in the block diagrams and/or flow diagrams can be implemented by a specific hardware-based system performing specified functions or operations, or can be implemented by a combination of a specific hardware with computer instructions.

It should be understood that the above embodiments are merely exemplary embodiments used only for illustrating the principle of the present disclosure. However, the present disclosure is not limited thereto. Obviously, those skilled in the art can make various modifications and variants to this disclosure without departing from spirit and scope of this disclosure. As such, if these modifications and variants of this disclosure fall into the scope of the claims and their equivalents, the present disclosure intends to include these modifications and variants.

What is claimed is:

1. An application programming interface (API) service apparatus, comprising a gateway device and a back-stage management device, wherein the gateway device is configured to receive and store information regarding API resources, and is configured to validate a request for invoking the API resources and to determine the API resources corresponding to the request for invoking the API resources which has passed the validation based on the stored information regarding the API resources and to invoke the API resources in corresponding servers corresponding to the request for invoking the API resources which has passed the validation; and the back-stage management device is configured to receive publication information for the API resources, and to check the received publication information for the API resources, wherein the gateway device is further configured to monitor an invocation condition of the API resources corresponding to information of the API resources, to obtain invocation information.

2. The application programming interface (API) service apparatus of claim 1, wherein the invocation information comprises at least one of an invocation amount of the API resources, an invocation form of invoking the API resources, a response time to the request for invoking the API resources and an error rate of the API service apparatus.

3. The application programming interface (API) service apparatus of claim 2, wherein the back-stage management device is further configured to add information for the API resources comprised in the publication information for the API resources which has passed the checkout to the gateway device.

4. The application programming interface (API) service apparatus of claim 1, wherein the back-stage management device comprises a user management processor and a back-stage management processor, the back-stage management processor is configured to check the received publication information for the API resources, and to add the information for the API resources which has passed the checkout to the gateway device, and to select an authority of an operation of an account type associated with the API service apparatus, and the user management processor is configured to allocate an authority corresponding to the account type of the account associated with the API service apparatus according to the authority defined by the back-stage management processor.

5. The application programming interface (API) service apparatus of claim 4, wherein the back-stage management device is further configured to perform at least one of the following operations of:

creating an account, deleting an account, managing account information for a requester of the API resources, managing account information for a publisher of the API resources, inquiring a log for invoking the API resources, performing the examination and approval of a real name authentication of the subscriber of the API resources and inquiring a log for operations of an administrator.

6. The application programming interface (API) service apparatus of claim 5, wherein the user management processor is configured to allocate the authority of publishing the API resources for the account of the publisher of the API resources;

the user management processor is further configured to allocate for the account of the back-stage administrator at least one of the authorities of: the authority of checking a real name authentication of the subscriber of the API resources, the authority of checking the publication information, the authority of managing a category of the API resources which have passed the checkout.

7. The application programming interface (API) service apparatus of claim 1, wherein the gateway device is configured to perform an identity authentication and an authority authentication for the account corresponding to the request for invoking the API resources in response to a reception of the request for invoking the API resources, and the gateway device is further configured to invoke the corresponding API resources with the identity authentication and the authority authentication of the account corresponding to the request for invoking the API resources being in the state where the authentication has been passed.

8. The application programming interface (API) service apparatus of claim 7, wherein the gateway device is configured to support a Hash-based Message Authentication Code algorithm signature and a Secure Sockets Layer encryption.

9. The application programming interface (API) service apparatus of claim 1, wherein the gateway device is further configured to identify key words of the request for invoking the API resources received by the gateway device, and invoke the corresponding API resources according to the key words.

10. The application programming interface (API) service apparatus of claim 1, wherein the gateway device is configured to perform a protocol conversion, to convert a computer language of the corresponding request for invoking the API resources into a computer language of the request for invoking the API resources which has passed the verification from the gateway device in the case where the computer language of the request for invoking the API resources which has passed the verification from the gateway device is inconsistent with the computer language of the corresponding API resources.

11. The application programming interface (API) service apparatus of claim 1, wherein the gateway device is further configured to perform at least one of the following functions of: a limit for a blacklist and a whitelist of Internet Protocol locations, a limit for invocation flows, a network protocol encryption transmission, a Access Key/Secret Access Key and a certificate validation, a service authority.

12. An application programming interface (API) service system, comprising at least one front end device and the API service apparatus according to claim 1, wherein
the front end device includes a front end processor and a display device, the display device configured to display an API service interface for receiving the inputted request for invoking the API resources and for providing a portal uploading the publication information for the API resources, under a control of the front end processor, the front end processor configured to send the request for invoking the API resources to the gateway device of the API service apparatus, and the front end processor is further configured to receive the publication information for the API resources and send the publication information for the API resources to the back-stage management device of the API service apparatus.

13. The application programming interface (API) service system of claim 12, wherein the front end processor is further configured to control the display device to show a search portal through which the API service interface shows the API resources, and the front end processor is also configured to search in the information for the API resources stored in the gateway device according to a received search instruction, and generate the search result.

14. The application programming interface (API) service system of claim 12, wherein the front end processor is also configured to control the display device to show in the API service interface at least one of following functions of: showing information for the API resources stored in the gateway device in a predetermined rule, showing a publication rule for the API resources, showing a registration interface for users, showing a login interface for users, showing a checking result of the publication information for the API resources by the back-stage management device, showing a verification result of the invocation request by the gateway device.

15. The application programming interface (API) service system of claim 12, wherein
the invocation information includes at least one of: an invocation amount of the API resources, an invocation form of invoking the API resources, a response time to the request for invoking the API resources and an error rate of the API service apparatus; and
the back-stage management device is further configured to add information for the API resources to the gateway device with the publication information for the API resources being in the state where the checkout has been passed.

16. The application programming interface (API) service system of claim 12, wherein the back-stage management device comprises a user management processor and a back-stage management processor,
the back-stage management processor is configured to check the received publication information for the API resources, and to add the information for the API resources which has passed the checkout to the gateway device, and to select an authority of an operation of an account type associated with the API service apparatus, and
the user management processor is configured to allocate an authority corresponding to the account type of the account associated with the API service apparatus according to the authority defined by the back-stage management processor.

17. The application programming interface (API) service system of claim 16, wherein the back-stage management device is further configured to perform at least one of the following operations of:
creating an account, deleting an account, managing account information for a requester of the API resources, managing account information for a publisher of the API resources, inquiring a log for invoking the API resources, performing the examination and approval of a real name authentication of the subscriber of the API resources and inquiring a log for operations of an administrator.

18. The application programming interface (API) service system of claim 17, wherein the user management processor is configured to allocate an authority of publishing the API resources for the account of the publisher of the API resources;
the user management processor is further configured to allocate for the account of the back-stage administrator at least one of the authorities: the authority of checking a real name authentication of the subscriber of the API resources, the authority of checking the publication information, the authority of managing a category of the API resources which have passed the checkout.

19. The application programming interface (API) service system of claim 12, wherein the gateway device is configured to perform an identity authentication and an authority authentication of the account corresponding to the request for invoking the API resources in response to a reception of the request for invoking the API resources, and the gateway device is further configured to invoke the corresponding API resources with the identity authentication and the authority authentication of the account corresponding to the request for invoking the API resources being in the state where the authentication has been passed.

* * * * *